United States Patent [19]

Toyokawa

[11] Patent Number: 4,673,987

[45] Date of Patent: Jun. 16, 1987

[54] COMPRESSED BLOCK CODE FOR FACSIMILE TRANSMISSION

[75] Inventor: Kazuhara Toyokawa, Kanagawa, Japan

[73] Assignee: IBM Corporation, Armonk, N.Y.

[21] Appl. No.: 725,970

[22] Filed: Apr. 22, 1985

[51] Int. Cl.[4] ............................................. H04N 1/40
[52] U.S. Cl. ................................... 358/260; 358/261; 358/280
[58] Field of Search ............... 358/260, 261, 280, 283, 358/263; 382/56; 340/347 AD

[56] References Cited

U.S. PATENT DOCUMENTS

| | | | |
|---|---|---|---|
| 4,150,400 | 4/1979 | Wong | 358/260 |
| 4,245,258 | 1/1981 | Holladay | 358/283 |
| 4,365,273 | 12/1982 | Yamada et al. | 358/260 |
| 4,366,506 | 12/1982 | Ejiri et al. | 358/260 |
| 4,369,463 | 1/1983 | Anastassiou et al. | 358/135 |
| 4,409,623 | 10/1983 | Kobayashi et al. | 358/261 |
| 4,446,516 | 5/1984 | Nishimura | 358/260 |

OTHER PUBLICATIONS

Murat and Johnson: "Block Coding of Graphics: A Tutorial Review", Proc. IEEE, vol. 68, No. 7, pp. 770-786, Jul. 1980.

C. N. Judice, A. B. White, R. L. Johnsen: "Transmission and Storage of Dither Coded Images Using 2-D Pattern Matching", Proc. SID, vol. 17, No. 2, pp. 85-91, 2Q, 1976.

CCITT Study Group XIV: "Report of the Meeting Held in Kyoto", 7-15 Nov., 1979.

R. Hunter and A. H. Robinson, "International Digital Facsimile Coding Standards", Proceedings I.E.E.E., vol. 68, No. 7, 7-1980.

Primary Examiner—Edward L. Coles, Sr.
Attorney, Agent, or Firm—Perman & Green

[57] ABSTRACT

A coding process for a facsimile transmission system employs block coding and dither matrices of black and white picture elements, wherein each matrix represents a portion of a subject. The subject is scanned to provide gray-scale tone-level data, and the data of continuous tone regions of the subject is represented by standardized patterns in matrix form. A run of identical patterns is counted in the scanning direction and a symbol indicating the number of such repetitions is placed in the code in lieu of the succession of code words representing individual ones of the repeating patterns. A second symbol is inserted into the code to indicate a succession of runs of repeating patterns in the same column now positioned in two or more rows. The second symbol is utilized in lieu of a repetition of code words corresponding to each of the repeated patterns. The two symbols provide for two dimensional compression of the length of the message for improved efficiency of transmission of pictorial data between the subject and a display of an image of the subject.

9 Claims, 3 Drawing Figures

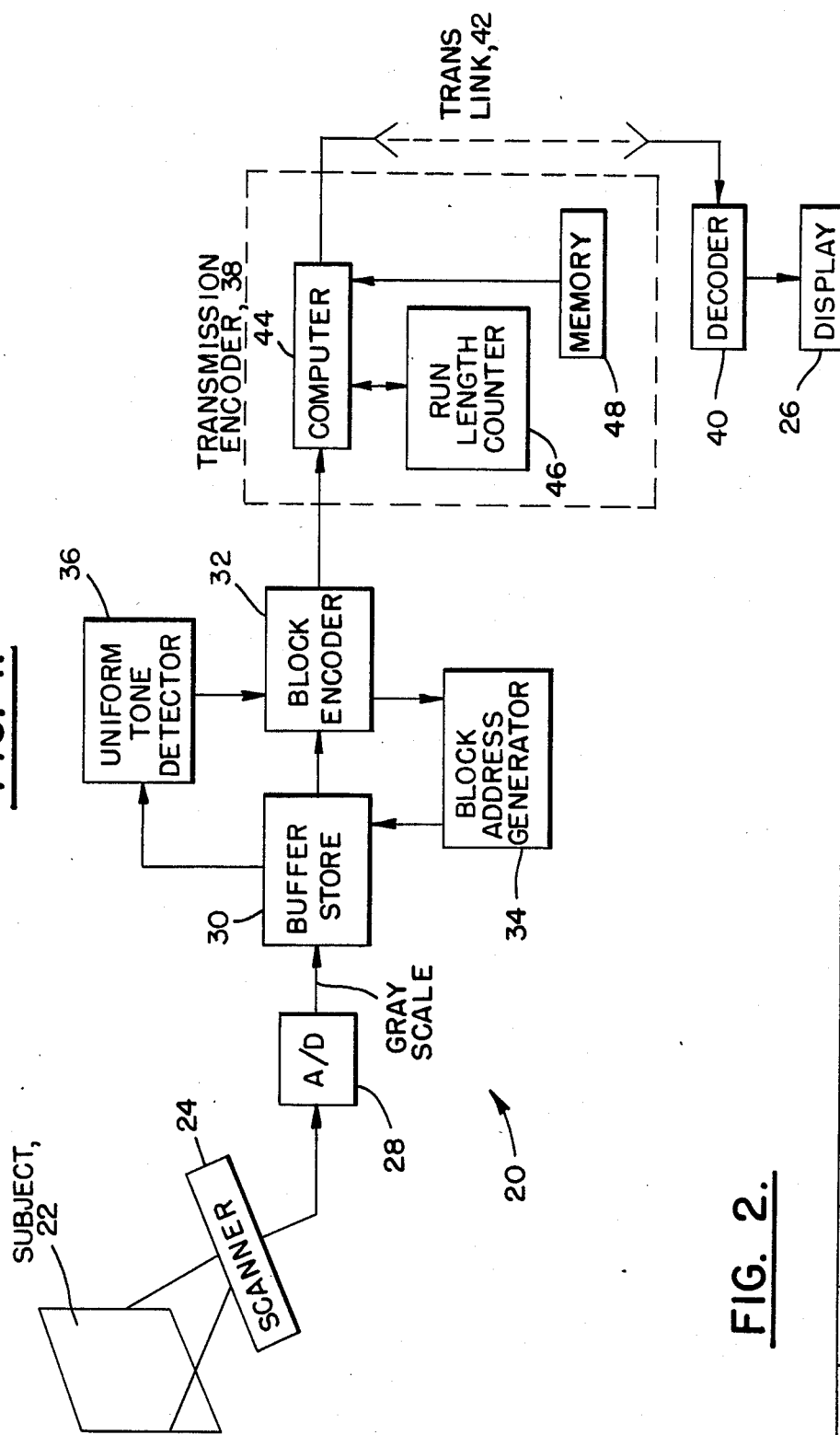

COMPRESSED BLOCK CODE FOR FACSIMILE TRANSMISSION

TECHNICAL FIELD

This invention relates to the transmission of facsimile data and, more particularly, to the compressing of a data stream of block coded pictorial data including dither coded images.

PRIOR ART

Facsimile systems may be employed for transmitting pictorial data of subject matter including black characters on a white background as well as images rendered in multiple tones of a gray scale. The data is obtained by scanning the subject and, after transmission, may be stored for later use, or presented on any of various displays ranging from a cathode ray tube to a dot-matrix ink-jet printer.

Block coding of pictorial images enables the presentation of multiple tone images on binary media. The multiple tone images may have regions of substantial uniformity of gray tone level and regions of intricate detail. The binary media includes any form of display in which image data is to be presented by an array of black and white picture elements or pels. In the case of an image to be formed of black elements on a white background, the displayed image is formed as a two-dimensional array of many contiguous blocks wherein, in each block, the density and distribution of black pels is varied to create the visual impressions of gray tone and subject detail.

A problem arises in that the transmission of multiple-bit digital words representing the gray level of each pel in the subject may require a much larger transmission bandwidth than is available, or alternatively, may require an excessive amount of time. In addition, in much subject matter there are often extensive regions of a continuous single tone level of the gray scale, in which case it is a waste of transmission capacity of transmit detailed information of each pel gray level throughout such uniform regions.

SUMMARY OF THE INVENTION

The foregoing problem is overcome and other advantages are attained in a facsimile transmission system employing a process for compressing a transmission code for block coded images including dither coded images. In accordance with the invention, the process comprises a step of analyzing block coded data to determine the presence of blocks designating regions of uniform tone. Such block are provided with standard arrangements of black pels on a white background with the number of black pels dependent on the level of gray. As a further step in the process, the standardized blocks are identified by specific code names for transmission of the code names rather than detailed information about each pel in a block. A block representing an intricate part of an image, rather than a uniform background, is identified as such as is encoded with the original bit pattern.

The process then provides for a counting of repetitions in a run of standard blocks along a scan line, and introduces a code compression by insertion of a suffix to a code word. The suffix designates the number of repetitions of the standard block, and is transmitted in lieu of a repetition of code words for the respective blocks. Further compression is attained by noting an equality, if present, between a run of blocks in one row with a run in a succeeding row for transmission of an additional suffix in lieu of the repetition of words for the blocks in each of the succeeding runs. Those blocks identified as representing an intricate part of the image are transmitted without the foregoing compression.

BRIEF DESCRIPTION OF THE DRAWINGS

The foregoing aspects and other features of the invention are explained in the following description taken in conjunction with the accompanying drawings wherein:

FIG. 1 is a block diagram of a picture transmission system incorporating the process of the invention for compression of a code employed in transmission of image data;

FIG. 2 shows a two-dimensional coding scheme used in carrying out the process of the invention.

DETAILED DESCRIPTION OF THE PREFERRED EMBODIMENT OF THE INVENTION

Figure 3:
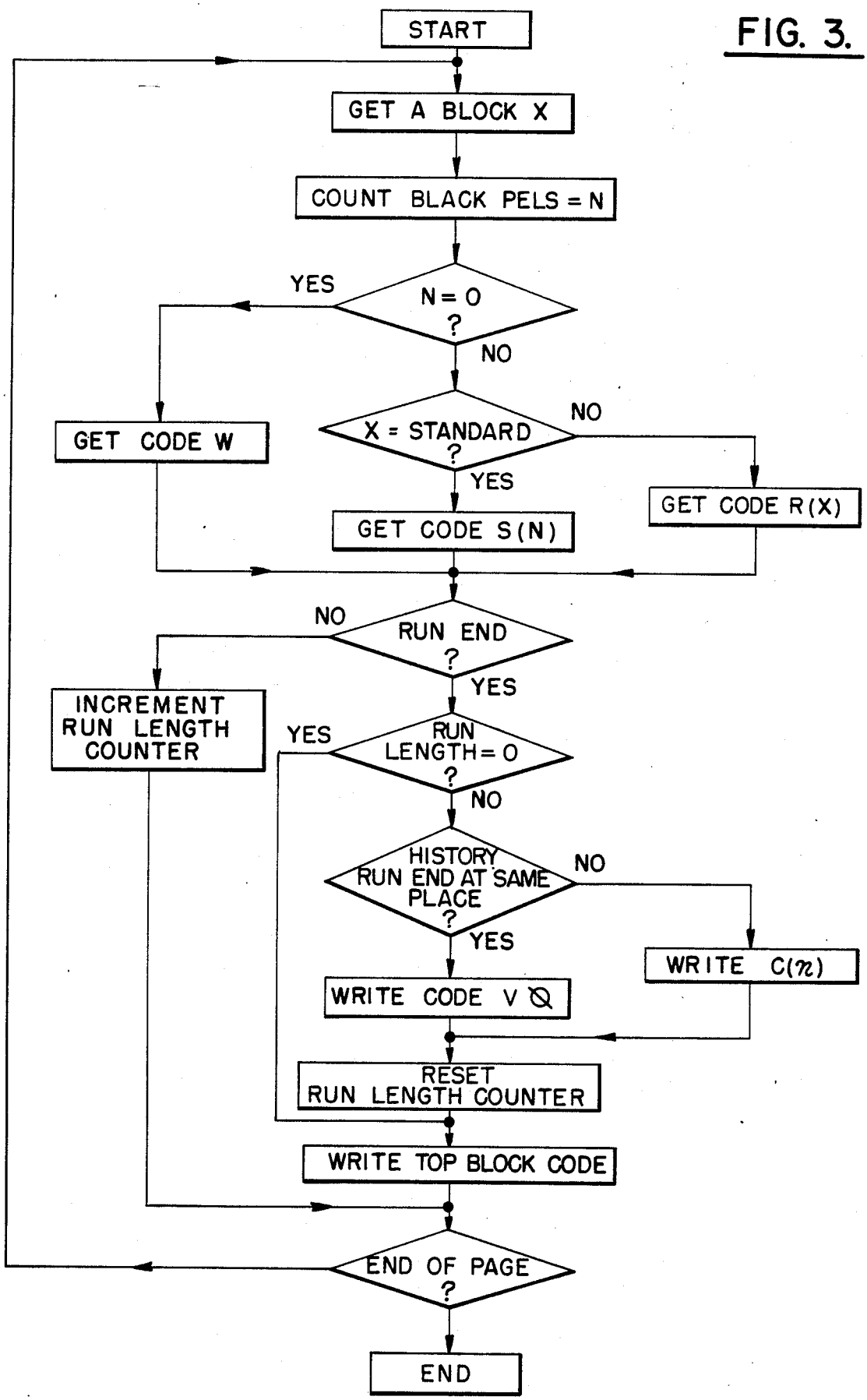
FIG. 3 is a flow diagram of the process of the invention.

FIG. 1 shows a picture transmission system 20 wherein a subject 22 is scanned by a scanner 24 for presentation as an image upon a display 26. In accordance with the invention, picture elements or pels of the subject 22 are encoded with a block code such as a dither block code, and are then further encoded by the system 20 with an encoding process of the invention which compresses a digitized representation of a dither coded image of the subject 22 to provide a more efficient transmission of data of the subject 22 to the display 26.

The system 20 further comprises an analog-to-digital converter 28, a buffer storage 30, a block encoder 32, a block address generator 34, a uniform tone detector 36, a transmission encoder 38, a decoder 40, and a transmission link 42. The transmission encoder 38 comprises a computer 44, a run-length counter 46 and a memory 48.

In operation, the scanner 24 provides an analog representation of each pel of the subject 22, which representation is converted by the converter 28 to a digitally formatted gray scale for each pel. Digital output signals of the converter 28 are stored in the buffer storage 30 for subsequent processing by the encoder 32.

The encoder 32 activates the generator 34 to address blocks of pels stored in the storage 30. In accordance with well-known dither block coding of an image, the set of pels of the subject 22 is arranged in two-dimensional array of square matrices. As will be described hereinafter, each matrix may be a 4×4 matrix, an 8×8 matrix or larger matrix. A matrix may be located in a region of the subject 22 having a uniform continuous gray tone which is detected by the detector 36. In response to the detection of the continuous tone, the encoder 32 outputs a dither code word designating a matrix with a predetermined array of black and white pels which present a visual impression to an observer of the display 26 of a uniform region having the correct tone of the gray scale. Alternatively, a matrix may be located in a region of the subject 22 having a detailed design in which case the encoder 32 outputs a code work identifying the logic stages of all of the pels in the matrix. The encoder 32 outputs a message comprising a succession of code words which describes an image of the subject 22.

In accordance with the invention, the succession of code words of the message outputted by the block encoder 32 is compressed by the transmission encoder 38 to become a substantially shorter message which fully describes the image while being more efficiently transmitted over the link 42. As will be explained hereinafter, the computer 44 analyzes the array of matrices to determine the presence of groups of contiguous identical matrices arranged along rows and columns of the array, such as occurs in an extended area of the subject 22 having a common gray tone. Instead of transmitting repetitively the identifying legends of the matrices of such groups, the computer 44 appends a suffix to a code work which indicates the extent of the repetition of a matrix in the directions of both row and column. This is accomplished with the aid of the counter 46 which counts the number of identical matrices in a run of such matrices, and the memory 48 which stores a program and data for operation of the computer.

The message, as modified by the transmission encoder 38 is then transmitted via the link 42 to the decoder 40 which extracts the data of the pels from the coded message for presentation on the display 26. The transmission link 42 may be constructed in a suitable well-known fashion, and may include modems, a transmitter and a receiver (not shown). Because of the reduced number of words in the message, the message may be transmitted more quickly or, may be transmitted over a transmission link of smaller bandwidth. The coding process employed by the transmission encoder 38 in carrying out the invention will now be explained in further detail.

The process employs block coding with a block of picture elements each of which has a size equal to that of a dither threshold matrix, and encoded each block according to a block coding table. A dither matrix is usually composed of 4×4 or 8×8 picture elements, however, the process can be applicable to any size matrix. In the following description, the 4×4 matrix is used by way of example to explain the coding process.

An exemplary dither matrix is:

$$
(D_{ij}) = \begin{vmatrix} 15 & 2 & 3 & 12 \\ 7 & 10 & 9 & 4 \\ 0 & 13 & 14 & 1 \\ 8 & 5 & 6 & 11 \end{vmatrix} \quad (1)
$$

When an image with continuous gray tone areas is scanned, the gray tone within 4×4 picture elements is nearly constant in many cases. Even when a bilevel text/graphics picture is scanned, the background of the picture is often uniform white or gray level. Then the dither coded block patterns corresponding to the uniform gray tone occur frequently, and are important for encoding the data.

By way of example, the originally scanned data may have an average gray level of value 7.5 within a a block, the bit pattern of dither coded data is '9669' in hexadecimal notation, where a bit of logic level '1' represents a black pel and a bit of logic level '0' represents a white pel.

Specific blocks are designated as follows. The uniform gray block patterns are 'standard', S, patterns. When all bits within a block are white, the block is designated 'white', W. Shorter codes disclosed hereinafter, are assigned for these W and S patterns. When a block pattern deviates from W or S, the block is designated 'random', R, and is encoded with the original bit pattern.

To discriminate W, S, and R, a suffix is attached to each code. The whole block coding table is shown in Table 1. The 'continue' code in the bottom line will be explained in the following section.

TABLE 1

| | 1-DIMENSIONAL CODING TABLE | | | |
|---|---|---|---|---|
| Block | Notation | Bit Pattern (in Hexa) | Code Suffix | Bits Tail |
| White | W | '0 0 0 0' | '00' | — |
| Standard | S(1) | '0080' | '10' | '0000' |
|  | S(2) | '0090' | '10' | '0001' |
|  | S(3) | '4090' | '10' | '0010' |
|  | S(4) | '6090' | '10' | '0011' |
|  | S(5) | '6190' | '10' | '0100' |
|  | S(6) | '6194' | '10' | '0101' |
|  | S(7) | '6196' | '10' | '0110' |
|  | S(8) | '6996' | '10' | '0111' |
|  | S(9) | '699E' | '10' | '1000' |
|  | S(10) | '6B9E' | '10' | '1001' |
|  | S(11) | '6F9E' | '10' | '1010' |
|  | S(12) | '6F9F' | '10' | '1011' |
|  | S(13) | '7F9F' | '10' | '1100' |
|  | S(14) | '7FDF' | '10' | '1101' |
|  | S(15) | '7FFF' | '10' | '1110' |
|  | S(16) | 'FFFF' | '10' | '1111' |
| Random | R(**) | '' | '11' | '** ... *' bit (16) |
| Continuous | C(n) | same with Prev. block | '01' | '****' |

With respect to the two-dimensional array of square matrices of which the image is composed, the first dimension is in the direction of a line of scanning or horizontal directions and the second dimension is perpendicular thereto, in the vertical direction. Since the majority of gray level pictures or bilevel text/graphics has nearly uniform gray or white area, the code S or W often continues over several blocks in the coding scheme. Moreover this 'run' often correlates to the neighboring lines. So 1-dimensional, 1-D. runlength coding, and 2-dimensional, 2-D, compression techniques are effective to reduce coded data volume.

It is convenient to introduce a concept of runlength in the block coding scheme as follow: a situation wherein the same block pattern continues over multiple blocks in the scanning direction is called a 'run'. The runlength is defined as the number of the following blocks, not including the top of first block of the run.

For a run with none-zero runlength, continuous codes, C(n), are attached to a top block code to describe the runlength. One C(n) consists of a 2 bit suffix and 4 bit binary number from '0000' to '1111' which represents the runlength, n, from 1 to 16. A run longer than 16 can be expressed by using several C(n), where each C(n) represents 4 binary digits. For example, a runlength of 129 blocks, '81' in hex' is expressed as C(8)C(0).

In the case of 2-dimensional compression, a current run is compared with a history run, e.g. the previous run of upper adjacent blocks, as shown in FIG. 2. If the current run has zero length or terminates at a different position than the history run, the compression is restricted to the horizontal direction, such compression being referred to as the horizontal mode. The horizontal mode is same as the 1-D scheme except that the suffix of the C(n) code is three bits. In case the current run terminates at the same position with the history run as shown in FIG. 2, the process encodes the run by the top block code followed by a vertical code, VO.

When one page image is scanned, the first block line, comprising the first four scanning lines, is encoded by the 1-D scheme since no history line is available. From the second block line, the 2-D scheme is applied. When the coding scheme is changed from 1-D to 2-D, the end of line code, EOL, is inserted. The EOL is also used at the end of the page. The process does not turn back from 2-D to 1-D. The 2-D coding table is shown in Table 2, and the flow diagram of the 2-D encoder is shown in FIG. 3. Table 2 shows that there are two symbols added as a component of the code for two-dimensional compression, one symbol for the vertical or columnar direction, and the other symbol for the horizontal or row direction.

TABLE 2

2-Dimensional Coding Table

| Mode | Notation | Bit Pattern (in Hexa) | Code Suffix | Bits Tail |
|---|---|---|---|---|
| Vertical | VO | Run ends at same position w/hist. Line | '011' | — |
| Horizontal | C(n) | Runlength n n > 0 | '010' | '****' |
| Misc. | EOL | End of page or 1-D end | '11' | '11 ... 1' 16 bits |

As shown in the flow chart of FIG. 3, the process begins by the selection of a block of pel, each such block having the pels arranged in the 4×4 matrix. Thereupon the number of black pels is counted to determine whether the block should be characterized as a white block, a standard block wherein a preset number of black pels are arranged in a preset format to represent a tone of the gray scale, or a random block in which the black and white pels have an arrangement showing a detail of the image.

As a result of the counting, the process continues along different paths depending on whether a white block, a standard block, or a random block has been detected. Corresponding indicia are applied as a suffix to the code work to complete the first phase in the encoding of the words which are to be transmitted over the communication link.

The process than continues with the counting of blocks in a run along a scan line to determine if there is a repetition of such blocks, and how many blocks may be present in such repetition. This is accomplished by use of the counter 46 (FIG. 1). This portion of the process is accomplished by noting whether the present block constitutes the end of a run, in other words, whether the present block is identical to the previous block. If the present block does not constitute the end of a run, then the process reverts to the analysis of the next block. The analysis of the succeeding blocks continues until the end of a run is detected.

In the event that the run length is equal to zero, the process enters the block code for that block. In the event that the run has a nonzero length, a comparison is made with information of a previous horizontal line of blocks, which information has been stored in the memory 48 (FIG. 1). It is noted that during the carrying out of the program for operation of the computer 44 (FIG. 1) for implementation of the process of the invention, the results of the analysis of the blocks along a horizontal row of the array of blocks is stored for future use in a comparison of a present run with a history run.

In the event that the present invention run differs from the history run, the appropriate suffix is written. In the event that the present run ends at the same place as the history run, then the corresponding element of the code is written to indicate that there has been a repetition of data in the vertical direction, or a second dimension, in the array of blocks composing the image. Thereafter, the run length counter is reset preparatory to counting such blocks as may appear in a succeeding run.

With reference also to FIG. 1, the foregoing elements of the code words are transmitted as a compressed message along the transmission line 42 to the decoder 40. The decoder 40 is responsive to each of the suffixed applied to the code words for storing data in a memory (not shown) of the display 26. For example, in the event that a nonzero run is indicated, the decoder directs the display 26 to copy the block data into a plurality of cells of the memory corresponding to the number of repetitions in the run. Similarly, in the event that there is a correspondence between successive runs in the vertical direction, the copying of the data of the single block proceeds into further cells of the display memory so that, upon completion of the transfer of the message along the transmission link 42, the memory is the display 26 is storing the same array of data as is stored in the memory 48. Thereupon, the data can be read out of the display memory for presentation on the display 26, and the resultant display will be an image of the same subject matter appearing the subject 22.

The coding efficiency of the process has been tested with dither images of a standard test charts employing both bilevel text/graphics and gray tone picture/graphics, as well as a picture of scenery having areas of uniform gray scale and areas of intricate detail. In both cases a significant rate of data compression was obtained, the compression rate being 2.88 and 2.76, respectively, for the foregoing two test situations as compared to a raw image compression rate of unity.

Accordingly, the foregoing process can compress both bilevel text/graphics images and dither coder images efficiently. By taking into account the presence of frequently occurring block patterns in dither coded images, the process provides shorter codes for transmission of the image data. It is noted that the patterns of pels in each of the blocks is dependent upon the dither matrix, rather than upon the specific images which may be scanned. Accordingly, the specific block codes, such as the codes of the foregoing standard blocks, are assigned prior to the scanning of the subject 22.

It is also noted that the foregoing process provides the important feature of real-time encoding so that image data can be transmitted without any significant processing delays.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

Having thus described my invention, what I claim as new, and desire to secure by Letters Patent is:

1. A process for encoding pictorial data of a subject for construction of an image thereof comprising:
   scanning the subject to obtain gray-scale tone-level data of individual pels of the subject;

converting tone-level data of each subject pel to a digital word identifying the tone level;

coding the data of the subject pels with a block code having individual code words corresponding to the tone levels of respective ones of the subject pels, and wherein some of the blocks of the code correspond to standardized patterns having predetermined arrays of black and white pels which patterns represent various uniform tone levels of the subject pels, and other ones of the blocks provide patterns having a random array of black and white pels which follow detail of the subject;

identifying individual ones of the standardized patterns, and the random patterns, with suffixes appended to the code;

detecting a repetition of the standardized patterns which may occur during a scanning of the subject; and inserting a further component of the code in place of repeated entries of code words for the repeated patterns, said further component designating the number of such repetitions.

2. A process according to claim 1 wherein one of said standardized pattern is totally white, there being no black pels thereon.

3. A process according to claim 1 wherein the arrays of black and white pels in block code patterns are formed as matrices having rows and columns.

4. A process according to claim 1 wherein said detecting includes a counting of repeated patterns along a direction of a line of said scanning.

5. A process according to claim 1 wherein said blocks represent contiguous portions of the subject, the portions being arranged in rows and columns, a row being parallel to a line of the scanning, the portions in any one row being formed by a plurality of successive lines of the scanning; and wherein said detecting includes a counting of contiguous blocks having the same pattern.

6. A process according to claim 5 wherein said further component of the code includes a row symbol to provide compression of code length for repetition in a run of patterns along a row, and a column symbol to provide compression of code lengths for repetition of runs in the direction of a column.

7. A process according to claim 1 wherein said further component comprises a row symbol designating a number of repetitions of a pattern in the direction of a scan line, and a column symbol indicating the repetition of a run of repeating contiguous pattern in two successive rows.

8. A process according to claim 1 wherein said block coding employs a dither matrix.

9. Apparatus for compressing the length of a message communicated by a facsimile communication system comprising:

means for scanning a subject to obtain gray-scale tone-level data of individual pels of the subject;

means for converting tone-level data of each subject pel to a digital word identifying the tone level;

means for coding the data of the subject pels with a block code having individual code words corresponding to the tone levels of respective ones of the subject pels, and wherein some of the blocks of the code correspond to standardized patterns having predetermined arrays of black and white pels which patterns represent various uniform tone levels of the subject pels, and other ones of the blocks provide patterns having a random array of black and white pels which follow detail of the subject;

processing means coupled to said coding means for modifying a series of code words of the block code by replacing repeated entries of code words with a further code component designating the number of such repetitions, wherein the repeated entries of code words designate a continuum of scene data in the subject; and wherein said processing means operates via a process providing for identification of said standardized patterns and a detection of such repetition of the standardized patterns as may occur during a scanning of the subject, said modifying of the said series of code words being in response to said identification and said detection.

* * * * *